US011024900B2

(12) United States Patent
Chorian et al.

(10) Patent No.: US 11,024,900 B2
(45) Date of Patent: *Jun. 1, 2021

(54) BATTERY CELL SUPPORT ASSEMBLY

(71) Applicant: Ford Global Technologies, LLC, Dearborn, MI (US)

(72) Inventors: Steve F. Chorian, Canton, MI (US); Kimberley King, Northville, MI (US); Rajaram Subramanian, Ann Arbor, MI (US); Steve Droste, Ypsilanti, MI (US); Saravanan Paramasivam, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 503 days.

This patent is subject to a terminal disclaimer.

(21) Appl. No.: 15/492,084

(22) Filed: Apr. 20, 2017

(65) Prior Publication Data

US 2018/0309175 A1    Oct. 25, 2018

(51) Int. Cl.
*H01M 10/6555* (2014.01)
*H01M 2/10* (2006.01)
(Continued)

(52) U.S. Cl.
CPC ......... *H01M 10/6555* (2015.04); *B60L 50/64* (2019.02); *H01M 2/1077* (2013.01);
(Continued)

(58) Field of Classification Search
CPC ........... H01M 10/6555; H01M 2/1077; H01M 2/1083; H01M 10/625; H01M 10/0525; H01M 10/6551; H01M 10/647; H01M 2220/20; H01M 10/0486; H01M 10/0481; H01M 2/1094; B60K 6/28; B60L 11/1877; B60L 50/64; B60Y 2200/92; B60Y 2400/112; B60Y 2200/91; Y10S 903/907; Y02E 60/10; Y02T 10/70; Y02P 70/50
See application file for complete search history.

(56) References Cited

U.S. PATENT DOCUMENTS 5,441,824 A    8/1995  Rippel
8,802,264 B2   8/2014  Lin et al.
(Continued)

FOREIGN PATENT DOCUMENTS

WO    2016016017    2/2016

OTHER PUBLICATIONS

ASTM International, "Standard Test Method for Rubber Property—Durometer Hardness", Nov. 2017 (Year: 2017).*
(Continued)

*Primary Examiner* — Kwang Han
(74) *Attorney, Agent, or Firm* — David Kelley, Esq.; Carlson, Gaskey & Olds, P.C.

(57) ABSTRACT

An exemplary support assembly for a battery array includes a spacer axially separating a first battery cell from a second battery cell, a frame that holds the spacer, and an insert secured to the frame. The insert is compressed against the first battery cell. An exemplary method of supporting a battery cell includes compressing an insert against a corner region of a battery cell. The insert is secured to a frame made of a first material. The insert is made of a second material that is softer than the first material.

18 Claims, 6 Drawing Sheets

(51) Int. Cl.
    *H01M 10/625*     (2014.01)
    *H01M 10/647*     (2014.01)
    *H01M 10/04*     (2006.01)
    *B60L 50/64*     (2019.01)

(52) U.S. Cl.
    CPC ... *H01M 10/0481* (2013.01); *H01M 10/0486* (2013.01); *H01M 10/625* (2015.04); *H01M 10/647* (2015.04); *B60Y 2200/91* (2013.01); *B60Y 2200/92* (2013.01); *B60Y 2400/112* (2013.01); *H01M 2220/20* (2013.01); *Y02E 60/10* (2013.01); *Y10S 903/907* (2013.01)

(56) References Cited

U.S. PATENT DOCUMENTS

| | | | | |
|---|---|---|---|---|
| 2010/0136404 | A1* | 6/2010 | Hermann | H01M 10/6555 429/120 |
| 2013/0280596 | A1 | 10/2013 | Lee et al. | |
| 2013/0323572 | A1 | 12/2013 | Corson | |
| 2014/0302378 | A1* | 10/2014 | Tsuruta | H01M 2/1061 429/156 |
| 2015/0037626 | A1* | 2/2015 | Malcolm | H01M 2/206 429/53 |
| 2015/0037662 | A1 | 2/2015 | Pinon et al. | |
| 2015/0180095 | A1 | 6/2015 | Chen et al. | |
| 2017/0187080 | A1* | 6/2017 | Choi | H01M 10/613 |

OTHER PUBLICATIONS

Gauchel, Wolfgang and Sebastian Haag, Servopneumatic Clamping System for the Assembly of Battery Cells in the Area of Electromobility, Group 9—Pneumatics, 10th International Fluid Power Conference, Paper 9-3, p. 137-148, Dresden 2016.

U.S. Appl. No. 15/271,314, filed Sep. 21, 2016.

* cited by examiner

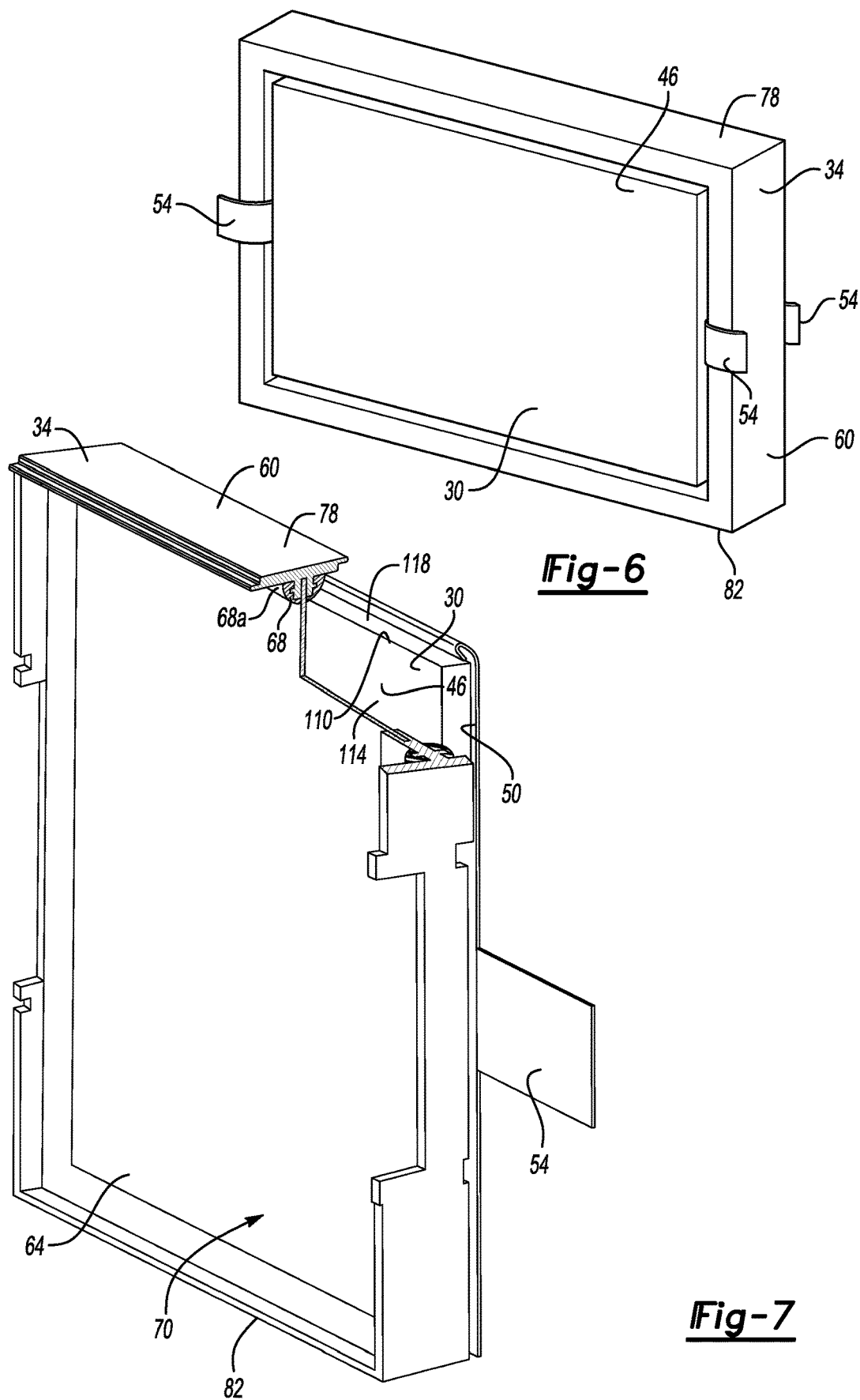

BATTERY CELL SUPPORT ASSEMBLY

TECHNICAL FIELD

This disclosure relates generally to a support assembly that holds battery cells of an electrified vehicle and, more particularly, to a support assembly incorporating a relatively soft insert.

BACKGROUND

Electrified vehicles differ from conventional motor vehicles because electrified vehicles are selectively driven using one or more electric machines powered by a battery pack. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

A battery pack of an electrified vehicle typically includes one or more battery arrays. Each of the battery arrays can include a plurality of battery cells along an axis. Support assemblies hold the battery cells within the battery arrays. Each of the support assemblies can include a relatively rigid frame disposed about an outer perimeter of one or more of the battery cells.

SUMMARY

A support assembly for a battery array according to an exemplary aspect of the present disclosure includes, among other things, a spacer axially separating a first battery cell from a second battery cell, a frame that holds the spacer, and an insert secured to the frame. The insert is compressed against the first battery cell.

In a further non-limiting embodiment of the foregoing support assembly, the frame is made of a first material and the insert made of a second material that is softer than the first material.

In a further non-limiting embodiment of any of the foregoing support assemblies, the first material has a higher durometer than the second material.

In a further non-limiting embodiment of any of the foregoing support assemblies, the frame is distributed about a periphery of the spacer.

In a further non-limiting embodiment of any of the foregoing support assemblies, the spacer is a metal or metal alloy fin.

In a further non-limiting embodiment of any of the foregoing support assemblies, the first and second battery cells are pouch cells.

In a further non-limiting embodiment of any of the foregoing support assemblies, the frame has a perimeter including a plurality of frame corners, and the insert is secured to the frame such that the insert compresses against the frame corners.

In a further non-limiting embodiment of any of the foregoing support assemblies, the insert comprises a foam or a rubber.

In a further non-limiting embodiment of any of the foregoing support assemblies, the first and second battery cells are disposed along an axis. The first battery cells have a corner region where an axially facing surface of the first battery cell meets a radially facing surface of the first battery cells. The insert is compressed against the corner region.

In a further non-limiting embodiment of any of the foregoing support assemblies, one of the frame or the insert includes a tab that is received within a groove provided by the other of the frame of the insert.

In a further non-limiting embodiment of any of the foregoing support assemblies, the frame and insert are portions of a traction battery pack of an electrified vehicle.

In a further non-limiting embodiment of any of the foregoing support assemblies, the insert is a first insert, the support assembly further comprises a second insert secured to the frame. The insert is compressed against the second battery cell.

In a further non-limiting embodiment of any of the foregoing support assemblies, an electrified vehicle battery array includes the support assembly as a first support assembly and further includes a plurality of second support assemblies disposed along an axis with first support assembly. The first support assembly and the second support assemblies are compressed along the axis.

A method of supporting a battery cell according to another exemplary aspect of the present disclosure includes, among other things, compressing an insert against a corner region of a battery cell. The insert is secured to a frame made of a first material. The insert is made of a second material that is softer than the first material.

A further non-limiting embodiment of the foregoing method includes securing the insert to the frame by molding the insert on to the frame.

In a further non-limiting embodiment of the foregoing methods, the frame and the insert are portions of a traction battery pack of an electrified vehicle.

A further non-limiting embodiment of the foregoing method includes powering a drive wheel of an electrified vehicle with the battery cell.

In a further non-limiting embodiment of the foregoing method, the corner region is where an axially facing surface of the battery cell meets a radially facing surface of the battery cell.

In a further non-limiting embodiment of the foregoing method, the battery cell is a pouch cell.

A further non-limiting embodiment of the foregoing method includes separating the battery cell from an adjacent battery cell with a spacer that is held by the frame, and communicating thermal energy from the battery cell using the spacer.

BRIEF DESCRIPTION OF THE FIGURES

The various features and advantages of the disclosed examples will become apparent to those skilled in the art from the detailed description. The figures that accompany the detailed description can be briefly described as follows:

FIG. 6 illustrates a perspective view of the support assembly and battery cells from FIG. 5 with the frame supporting the battery cells.

FIG. 7 illustrates the support assembly and one of the battery cells from FIG. 6 with selected portions of the frame removed.

DETAILED DESCRIPTION

This disclosure relates to a support assembly for holding a battery cell within a battery array. The support assembly includes, among other things, a frame, a spacer, and an insert. When the battery cell is positioned against the frame and the spacer, the insert compresses against the battery cell to help support the battery cell.

The insert is compressible. Accordingly, the insert can conform to geometries of the battery cell, and can maintain contact with the frame and the battery cells even if the geometries of the battery cell are irregular. The insert can also reduce vibratory loads introduced to the battery cell through the frame.

Figure 1:
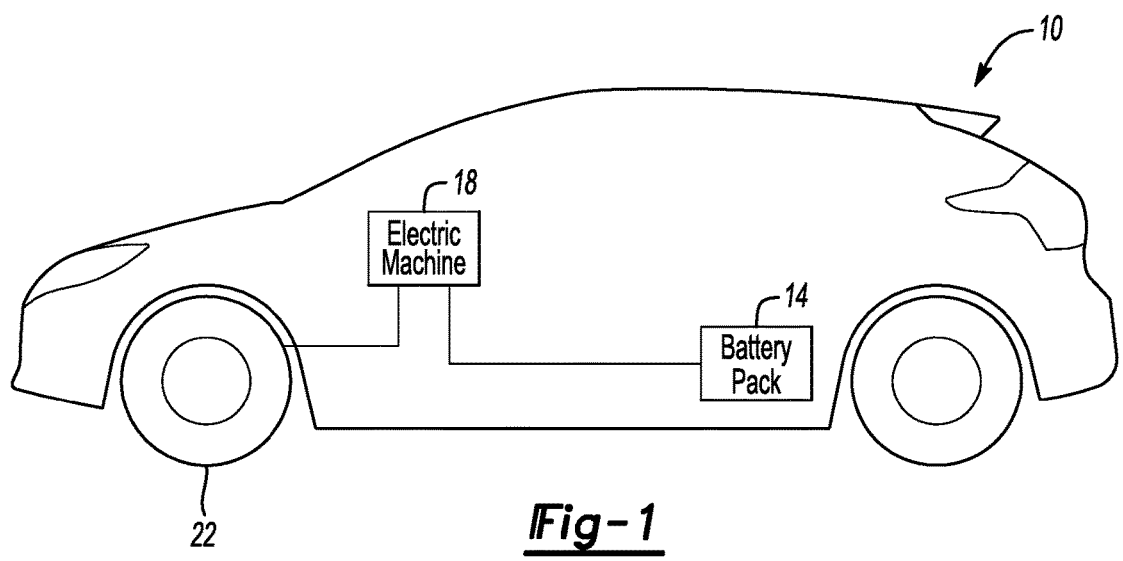
FIG. 1 illustrates a highly schematic view of an electrified vehicle.
Figure 2:
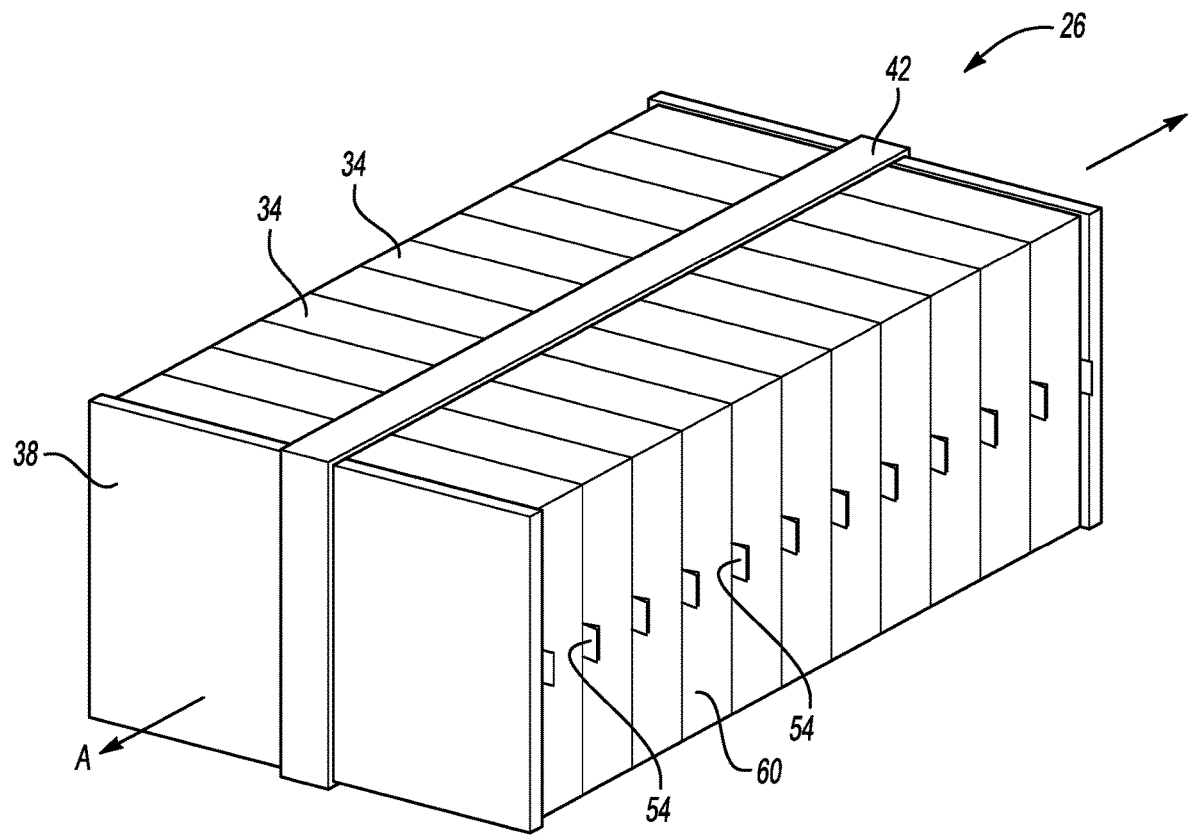
FIG. 2 illustrates a perspective and schematic view of an example battery array from a battery pack in the electrified vehicle of FIG. 1.
Figure 3:
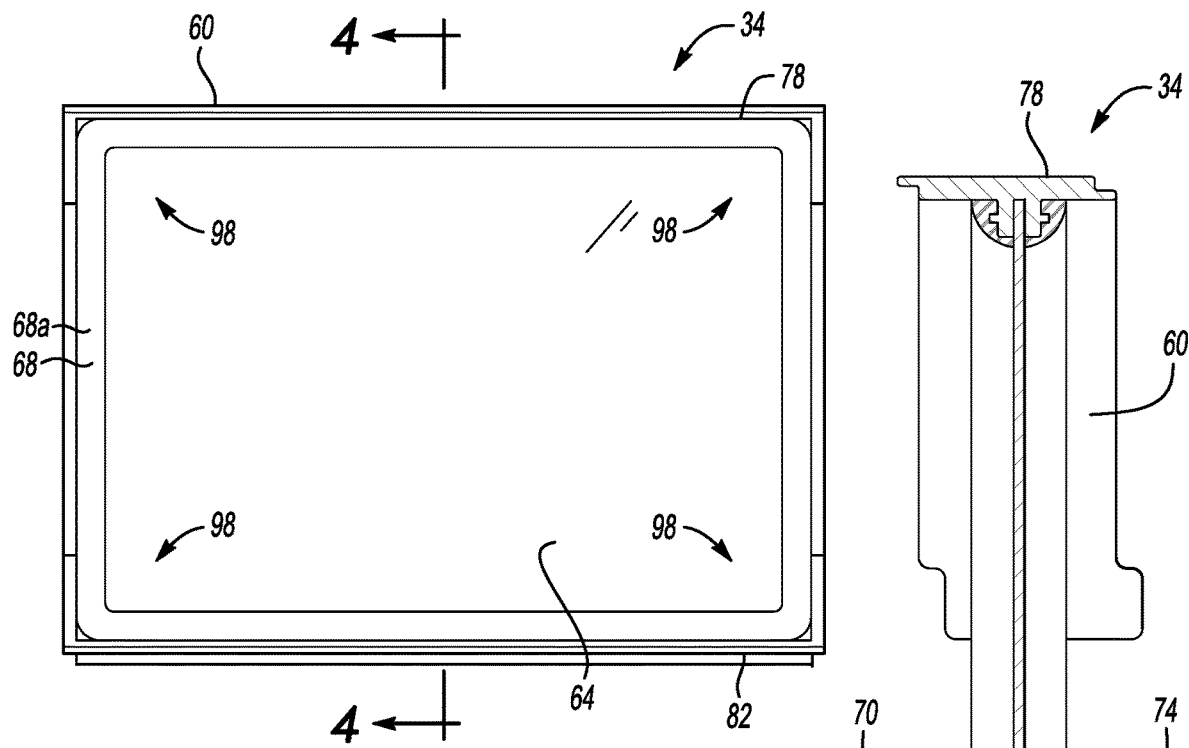
FIG. 3 illustrates a support assembly from the battery array of FIG. 2 according to an exemplary embodiment of the present disclosure.
Figure 4:
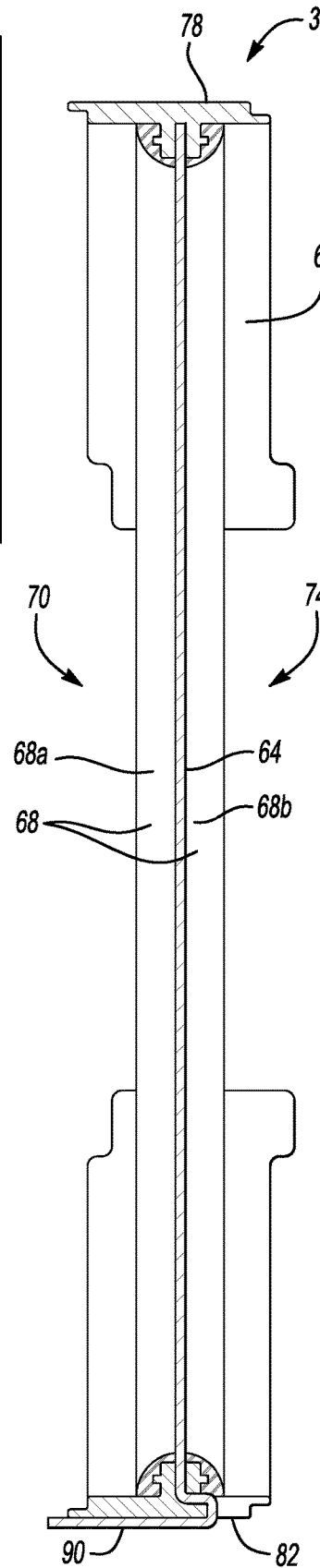
FIG. 4 illustrates a section view at Line 4-4 in FIG. 3.
Figure 5:
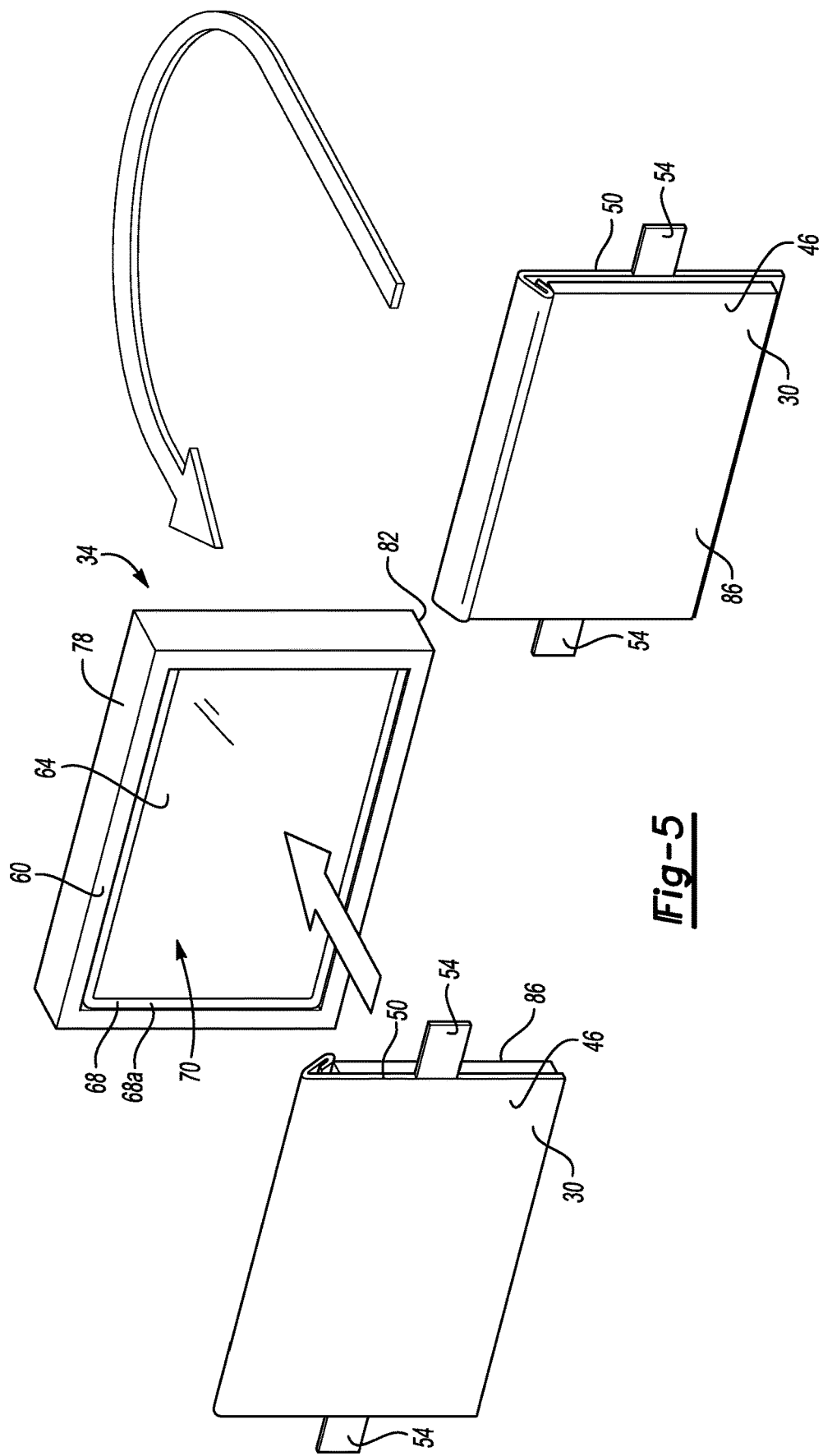
FIG. 5 illustrates a perspective, expanded view of the support assembly and battery cells from the battery array of FIG. 2 with a frame of the support assembly shown schematically.

Referring to FIG. 1, an example electrified vehicle 10 includes a battery pack 14, an electric machine 18, and a pair of wheels 22. The electric machine 18 can receive electric power from the battery pack 14. The electric machine 18 converts the electric power to torque that drives the wheels 22. The battery pack 14 can be considered relatively a high voltage traction battery pack.

The example electrified vehicle 10 is an all-electric vehicle. In other examples, the electrified vehicle 10 is a hybrid electric vehicle, which can selectively drive the wheels 22 with torque provided by an internal combustion engine instead of, or in addition to, the electric machine.

Referring now to FIGS. 2 to 6 with continuing reference to FIG. 1, the battery pack 14 includes an array 26. The battery pack 14 can include more than one array 26 in some examples.

In this exemplary embodiment, the array 26 includes a plurality of battery cells 30 and support assemblies 34 disposed along an axis A. The array 26 includes twenty-two battery cells 30 and eleven support assemblies 34, but other numbers of battery cells 30 and support assemblies 34 could be used.

Each of the example support assemblies 34 interfaces with two battery cells 30. In other examples, the support assemblies 34 could extend axially to interface with one battery cell 30, or more than two battery cells 30.

The battery cells 30 each have an axial width of about 5.46 millimeters in this example. The support assemblies 34 have an axial width that slightly greater slightly greater than the axial width of the battery cells 30. In another example, the support assemblies 34 have an axial width that is about twice the axial width of the battery cells 30.

Within the array 26, the support assemblies 34 and battery cells 30 are compressed axially between end plates 38. A band 42 is disposed about the array 26 to apply compression along the axis A to the frames 60 and the battery cells 30 of the array 26. The end plates 38 can be a metallic material.

In this embodiment, the battery cells 30 are lithium-ion pouch cells. The battery cells 30 include an active area 46 and a flange 50. Terminals 54 extend from the active area 46 and the flange 50. The battery cells 30 have an outer covering, or sheet, that is made of aluminum in this example. The covering is sealed at a perimeter of the battery cells 30 to close off the active areas 46. Generally, the flange 50 represents the sealed areas of the aluminum sheet.

Other embodiments could use other types of battery cells 30 that are used in connection with a frame, such as cylindrical cells or prismatic cells.

The example support assembly 34 includes a frame 60, a spacer 64, and an insert 68. Generally, the frame 60 resembles a picture frame and is distributed about a perimeter of the spacer 64. The frame 60 can include shiplap or tongue-and-groove-features that help the frame engage an axially adjacent frame within the battery pack.

The frame 60 provides an aperture 70 that partially receives one of the battery cells 30. The aperture 70 is rectangular and is sized to accommodate the battery cells 30. The battery cell 30 within the aperture 70 is compressed against the spacer 64. The aperture 70 is on a first axial side of the spacer 64.

The frame 60 provides another aperture 74 that receives another of the battery cells 30 on an opposing, second axial side of the spacer 64. The spacer 64 is thus sandwiched between axially adjacent battery cells 30.

The exemplary spacer 64 is partially embedded within the frame 60. The spacer 64 extends between a top portion 78 and a bottom portion 82 of the frame 60.

In this exemplary embodiment, the spacer 64 is an aluminum thermal fin or cooling fin. However, other materials are additionally contemplated, particularly other metal or metal alloy materials. The spacer 64 axially separates the battery cells 30 extending within the apertures 70 and 74. The spacer 64 can be in contact with side faces 86 of the battery cells 30. During certain conditions, the spacer 64 removes thermal energy from the battery cells 30. In other conditions, the spacer 64 adds thermal energy to the battery cells 30.

In one embodiment, a portion 90 of the spacer 64 extends through a passage in the bottom portion 82 of the frame 60. The portion 90 can be angled relative to other areas of the spacer 64 so that the portion extends underneath the bottom portion 82 outside of the frame 60. The portion 90 may contact a thermal exchange plate or a thermal interface material (not shown) to dissipate any thermal energy absorbed from the battery cells 30.

When the support assembly 34 is holding the battery cells 30 within the array 26, the active area 46 and at least some areas of the flange 50 are positioned within the apertures 70, 74 on opposite axial sides of the spacer 64. The terminals 54 extend outside the apertures 70, 74 and laterally past the support assemblies 34. The terminals 54 electrically connect the battery cells 30 with another structure, such as a bus bar, for example.

Power from the battery cells 30 can move to and from the terminals 54 through the bus bar. The power from the battery cells 30 can power the drive wheels 22. The electric machine 18 can recharge the battery cells 30 through the terminals 54.

The battery cells 30 of the array 26 can vary dimensionally. For example, the active area 46 of one of the battery cells 30 in the array 26 may be slightly larger than the active area 46 of another one of the battery cells 30 in the array 26. Each individual battery cell 30 could also have some dimensional variations. For example, a given one of the battery cells 30 could be have an axial thickness that is increased at the bottom of the battery cell 30 relative to an axial thickness at the top of the battery cell 30.

Dimensions of the frames 60 can also vary. For example, the aperture 70 of one of the frames 60 in the array 26 could be slightly oversized relative to the aperture 70 of another one of the frames 60.

Manufacturing tolerances, build tolerances, environmental factors, etc., can cause such variations in the frame 60 and battery cells 30. As can be appreciated, the variations can lead to inconsistent interfaces between the frame 60 and the battery cells 30. The example support assembly 34 helps to accommodate these variations by incorporating the insert 68.

The insert 68 fills open areas between the frame 60 and the battery cells 30 so that the battery cells 30 are securely supported within the support assembly 34. The insert 68 is softer than the frame 60 and, potentially, the battery cells 30. The insert 68 compresses against the frame 60, one of the battery cells 30 held by the frame 60, or both when the battery cell 30 is held within the support assembly 34.

The insert 68 comprises, in this example, a first insert 68a and a second insert 68b. The first insert 68a is secured to the frame 60 about a perimeter of the aperture 70. The second insert 68b is secured to the frame 60 about a perimeter of the aperture 74. The first insert 68a and the second insert 68b are on opposite sides of the spacer 64. Once secured to the frame 60, the first insert 68a can compress against the battery cell 30 held within the aperture 70. Once secured to the frame 60, the second insert 68b can compress against the battery cell 30 held within the aperture 74.

The frame 60 is made of a relatively rigid material such as a nylon-based polymer having a Shore D durometer value higher than 50. Rigid plastics that are not nylon-based could be used in place of the nylon-based polymer.

The insert 68 is made of a material that is softer than the material of the frame 60, such as a polyurethane foam having a Shore OO durometer value of less than 50. Other types of softer materials could be used for the insert, such as foams other than polyurethane foam, or rubber.

A durometer value of the frame 60 is higher than the durometer of the insert 68, which is why the insert 68 can be considered softer than the frame 60. The insert 68 could include foam having an outer skin of a different material. Materials for the frame 60 and the insert 68 can be selected to have other durometers based on a specific program target. Even if the durometers are changed, the frame 60 can remain rigid relative to the insert 68, and the insert 68 can meet compression targets.

The softness of the insert 68 can help to cushion the battery cells 30. That is, the insert 68 can help to absorb impact and shock loads.

In a specific exemplary embodiment, the battery cells 30 are radially oversized relative to the inserts 68a, 68b. As the battery cells 30 are moved into the respective one of the apertures 70, 74, the oversizing causes the battery cells 30 to compress respective one of the inserts 68a, 68b. In such the embodiment, the battery cells 30 are press-fit into the support assembly 34.

An amount that the insert 68 is compressed can vary depending on a spacing between the frame 60 and the battery cell 30 positioned within the respective aperture 70 or 74. For example, the insert 68 is more compressed in areas where the frame 60 is closer to the battery cell 30, and less compressed in areas where the frame 60 is further from the battery cell 30. The compressibility and softness of the insert 68 permits the support assembly 34 to maintain robust contact with the battery cell 30 even if there are variations in the spacing between the frame 60 and the battery cell 30. Spacing between the support assembly 34 and the battery cells 30 could undesirably accelerate fatigue due to vibrations, for example.

Notably, in this example embodiment, the insert 68 extends into frame corners 98, which may be particularly prone to gaps between the frame 60 and the battery cells 30. Positioning the insert 68 within the frame corners 98 can address gapping in these area by filling the potential gaps with the material of the insert 68.

Figures 8, 10:
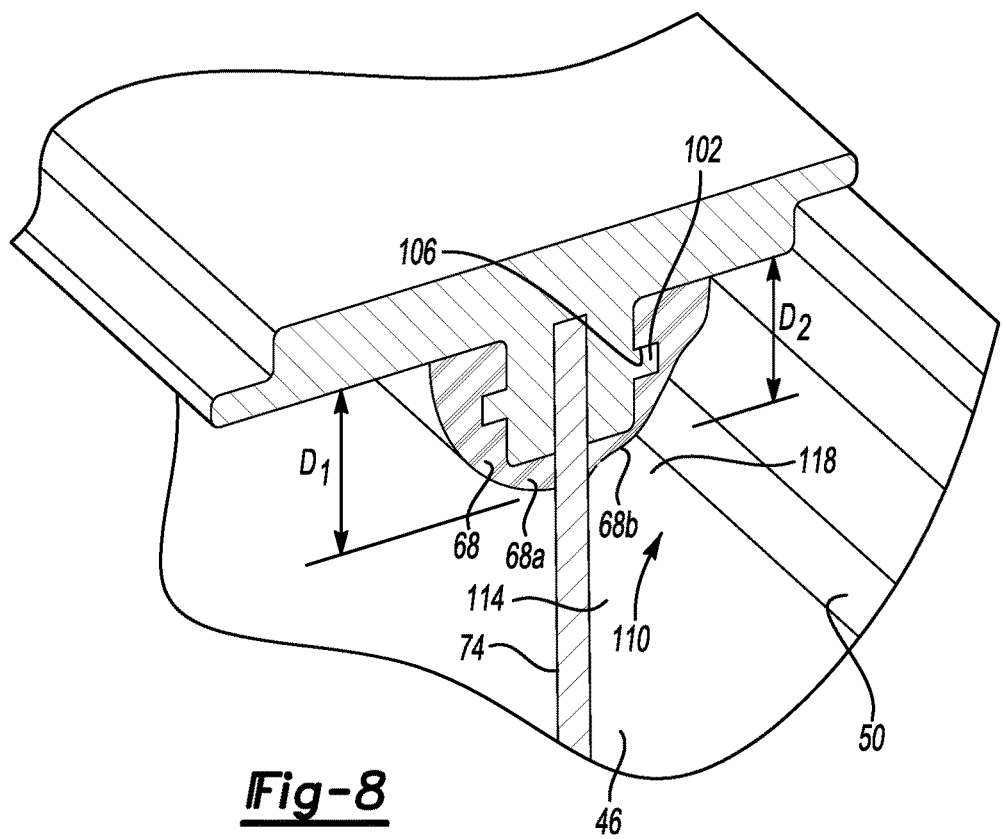
FIG. 8 illustrates a close-up view of a portion of FIG. 7.
FIG. 10 illustrates a front view of a support assembly according to still another exemplary embodiment.

Referring now to FIGS. 7 and 8, the insert 68 can be secured to the frame 60 using, for example, by positioning a tongue 102 of the frame 60 within a groove 106 of the insert 68.

In some examples, the insert 68, the spacer 64, or both, are in-molded with the frame 60. For example, the insert 68 could be secured to the frame 60 during a molding process. In such a process, the insert 68 is molded, the insert 68 is then is placed adjacent to a mold cavity for forming the frame 60. Material of the frame 60 is then moved into the mold cavity. The frame 60 cures in the cavity against the insert 68. Once the frame 60 cures, the insert 68 is secured to the frame flange 92.

The insert 68 is configured to, in this example contact a corner region 110 of the battery cells 30. Generally, the corner region 110 is where an axially facing surface 114 of the battery cell 30 meets a radially facing surface 118 of the battery cells 30.

Prior to installing the battery cells 30 within the aperture support assembly 34, the insert 68 extends a distance $D_1$ from the frame 60 as shown in FIG. 8. When the battery cells 30 are positioned in an installed position, the insert 68 is compressed such that the insert 68 extends a distance $D_2$ from the frame 60. The distance $D_2$ is less than the distance $D_1$. The movement of the battery cells 30 to the installed position thus compresses the insert 68.

The support assembly 34, with the insert 68, closely hugs the battery cells 30 and accommodates geometric variations and inconsistencies in frame 60 and the battery cell 30, such as in the transitions between the active area 46, shoulder 96, and flange 50.

Figure 9:
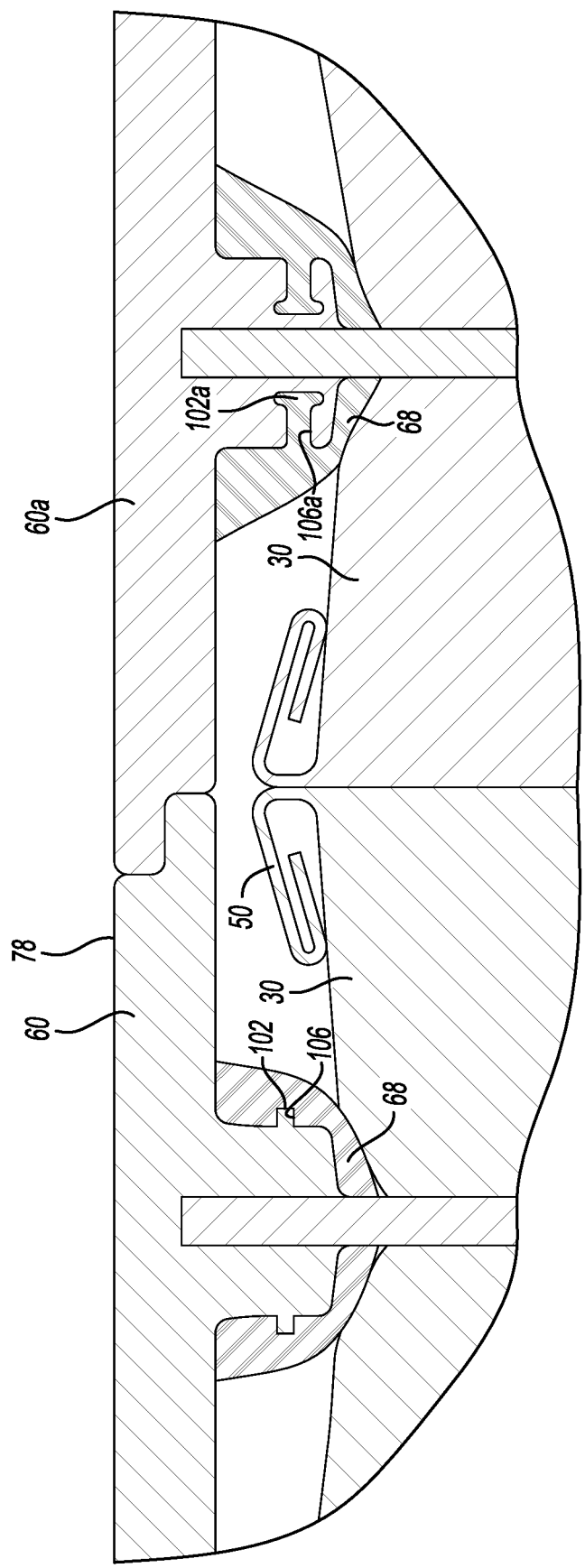
FIG. 9 illustrates a section view of a selected portion of a support assembly according to the first exemplary embodiment holding battery cells, and a support assembly according to another exemplary embodiment holding battery cells.

Referring now to FIG. 9, the insert 68 can be secured to the tongue 102 extending from the frame 60. Alternatively, as shown in connection with the frame 60a, the insert 68 could include a tongue 102a or extension received within a groove 106a of the frame 60a.

Referring now to FIG. 10, a support assembly 134 according to another exemplary embodiment includes an insert arrangement having two individual inserts 168 secured to one axial side of a frame 160. The inserts 168 extends within frame corners 198. The inserts 168 are spaced from each other to provide clearances C for terminals of battery cells held by the support assembly 134.

Features of some of the disclosed embodiments can include robustly retaining battery cells within frames by using an insert that conforms to non-uniform geometries at interfaces between the battery cells and the frames, which can reduce undesirable rubbing or chaffing of the battery cell. Geometries of battery cells, especially the geometries of pouch cells in the frame corners, can be difficult to hold to tight tolerances. Designing frames that grip the battery cells too tightly can cause package issues due to interference.

Another feature can include using the insert to dampen and cushion the battery cells, which can facilitate meeting vibration and impact/shock requirements by reduce impact loads and shocks to the battery cells. If the battery cell significantly vibrates, the battery cell's connection to a bus bar, for example, could be compromised. Another feature can include molding the inserts on to the frames so that manufacturing complexity is reduced. That is, the softer material of the insert is molded on to the harder material of the frame.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A support assembly for a battery array, comprising:
   a spacer axially separating a first battery cell from a second battery cell, wherein the spacer is a metal or metal alloy fin;
   a frame that holds the spacer; and
   an insert secured to the frame and compressed against the first battery cell, the frame made of a first material and the insert made of a second material, the first material having a higher durometer value than the second material.

2. The support assembly of claim 1, wherein the frame extends circumferentially continuously about a periphery of the spacer, and the frame projects forward and aft of the spacer about the entire periphery of the spacer.

3. The support assembly of claim 1, wherein the first and second battery cells are pouch cells.

4. The support assembly of claim 1, wherein the frame has a perimeter including a plurality of frame corners, and the insert secured to the frame such that the insert compresses against the frame corners.

5. The support assembly of claim 1, wherein the insert comprises a foam or a rubber.

6. The support assembly of claim 1, wherein the first and second battery cells are disposed along an axis, the first battery cell having a first corner region where an axially facing surface of the first battery cell meets a radially facing surface of the first battery cell, the insert compressed against the first corner region, the first battery cell having a second corner region that is opposite the first corner region, the insert compressed against the second corner region.

7. The support assembly of claim 1, wherein one of the frame or the insert includes a tab that is received within a groove provided by the other of the frame or the insert.

8. The support assembly of claim 1, wherein the frame and insert are portions of a traction battery pack of an electrified vehicle.

9. The support assembly of claim 1, wherein the insert is a first insert, the support assembly further comprising a second insert secured to the frame, the insert compressed against the second battery cell.

10. An electrified vehicle battery array comprising the support assembly of claim 1 as a first support assembly and further comprising:
    a plurality of second support assemblies disposed along an axis with the first support assembly, the first support assembly and the second support assemblies compressed along the axis.

11. The support assembly of claim 1, wherein the first and second materials are different materials.

12. A method of supporting a battery cell, comprising:
    compressing an insert against a corner region of at least one battery cell, the insert secured to a frame made of a first material, the insert made of a second material that is softer than the first material; and
    separating the battery cell from an adjacent battery cell with a spacer that is held by the frame, and communicating thermal energy from the battery cell using the spacer, wherein the spacer is a metal or metal alloy fin.

13. The method of claim 12, comprising securing the insert to the frame by molding the insert on to the frame.

14. The method of claim 12, wherein the frame and the insert are portions of a traction battery pack of an electrified vehicle.

15. The method of claim 12, further comprising powering at least one drive wheel of an electrified vehicle with the at least one battery cell.

16. The method of claim 12, wherein the corner region is where an axially facing surface of the battery cell meets a radially facing surface of the battery cell.

17. The method of claim 12, wherein the at least one battery cell is a pouch cell.

18. The method of claim 12, wherein the first material has a higher durometer value than the second material.

* * * * *